July 18, 1933.　　　　R. W. McLEAN　　　　1,918,770
GIN SAW BLADE AND METHOD OF MAKING SAME
Filed March 22, 1928
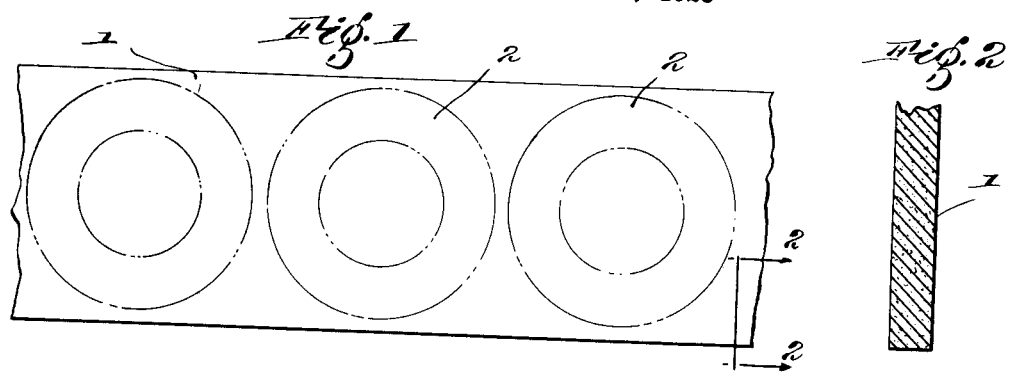
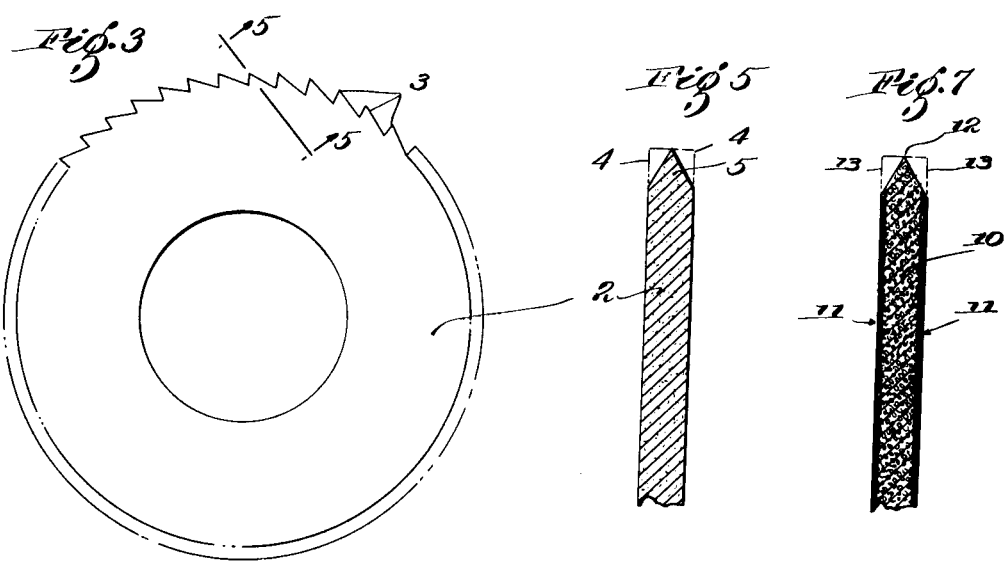
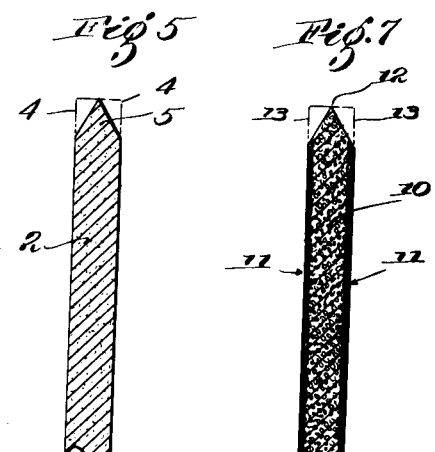
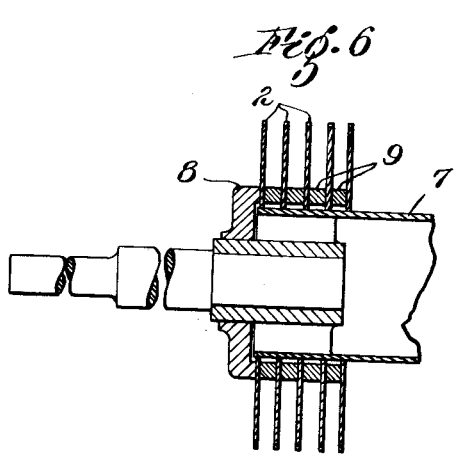
Inventor
Robert W. McLean
by Roberts Cushman Woodberry
Attys.

Patented July 18, 1933

1,918,770

UNITED STATES PATENT OFFICE

ROBERT W. McLEAN, OF BRIDGEWATER, MASSACHUSETTS, ASSIGNOR TO CARVER COTTON GIN COMPANY, OF BRIDGEWATER, MASSACHUSETTS, A CORPORATION OF MASSACHUSETTS

GIN SAW BLADE AND METHOD OF MAKING SAME

Application filed March 22, 1928. Serial No. 263,832.

This invention pertains to cotton gins and more particularly to a gin saw and to the process of making the same. Heretofore, so far as is known to me, it has been the universal custom to make gin saw blades from hot rolled steel, since it has been the generally accepted belief that the high polish and very hard surface-scale characteristic of hot rolled steel were essential to the production of a serviceable saw blade.

The usual process of producing gin saw blades starts with punching from hot rolled steel an annular blank of the desired diameter. These annular blanks thus punched from hot rolled steel are cupped or dished due to the relief of internal strains during the punching operation and must be flattened by a slow and expensive hand peening operation which leaves the surface covered with indentations. After flattening, the blanks are notched along their outer edges to form the rough teeth and these teeth are next filed to give them their final form. In the filing operation the teeth are reduced to pyramidal shape and in thus shaping the teeth, all of the outer skin or surface of the blank is removed, from the root of the tooth outwardly to its point, so that the tooth consists wholly of the central layer or core of the blank. In thus filing off the hard outer skin, the release of internal stress permits gradual deflection or twisting of the teeth out of accurate alignment during use, causing irregularity in operation and imperfect removal of the cotton fiber from the seed.

Furthermore, hot rolled steel plate is not of uniform thickness (or gauge); the hot rolled plate is not accurately flat and straight, often being warped or bent; and its crystalline structure is coarse and in a condition of non-uniform internal stress, and when such hot rolled steel is made up into gin saw blades, the individual blades are not of uniform thickness at diametrically opposite points and one blade differs from another in average thickness.

In a cotton gin the blades are not used independently, but a great number of blades are mounted, with interposed spacers in series on the same shaft to form the "saw cylinder." The lack of uniformity in thickness of the blades made from hot rolled steel, as above described, makes it difficult to build up a satisfactory saw cylinder, first, since the cumulative inaccuracy in thickness in the series of blades may be sufficient to cause the blades to interfere with the grate-fall bars of the gin, and secondly, because, when such a series of imperfect blades is placed under compression on the saw shaft, the latter is subjected to a bending stress which may throw it out of alignment. To remedy this difficulty, it is necessary to employ spacers of different thickness between consecutive pairs of blades of the cylinder. This makes the work of building a cylinder slow, laborious, and expensive, and repairs are also difficult since it is not possible to furnish standard parts.

While hot rolled steel has been demanded by the trade by reason of its hard, outer surface or skin, which was supposed to make the blades stronger and more wear-resistant, careful analysis of the situation shows that the hard outer surface of the blade in fact contributes nothing to its wear and edge-retaining qualities, for as above noted, the filing of the teeth removes all of the hard outer layer, leaving only the coarse grained core metal. Thus the supposed principal advantage of the hot rolled steel, to wit: its hard scale surface is wholly illusory, while, on the other hand, the coarse crystaline structure of its inner core is not at all well qualified to form a fine, sharp and durable cutting edge or point.

Although both hot rolled and cold rolled steel plates have been known for many years and have been available in any desired quantity, gauge and chemical analysis, to those engaged in the manufacture of gin saw blades, I am unaware that any one heretofore has ever successfully produced a gin saw blade by the use of cold rolled steel. The usual method of manufacture avoids any heat treatment of the blade after it is punched out from the sheet material, since such treatment would prohibitively increase the cost of manufacture. On the other hand, gin saw blades are called upon to withstand very hard use, during which they must perform the fiber separating action accurately, although constantly subjected to contact with sand and grit mingled with the seed cotton. For this reason, apparently, manufacturers of such saws have always employed hot rolled steel under the mistaken supposition, as above pointed out, that the very hard surface of hot rolled steel, consisting of hammer scale produced during the rolling process, contributes to the hardness and durability of the saw teeth.

Departing from the accepted practice in the manufacture of gin saw blades, I have conducted a series of experiments in the employment of cold rolled steel for this purpose and have found that by a proper selection of material, the cold rolled steel possesses many advantages for the purpose, resulting in more accurate work of the gin, lower initial cost of the blades and lower cost and more economical operation of the gin on account of the less frequent necessity for filing of the gin saws, and simplification of the manufacture and repair of saw cylinders by reason of the uniformity in gauge of the saw blades. I find that although a selected sample of cold rolled steel be of the same chemical analysis as a given sample of hot rolled steel, its physical characteristics are decidedly different. For instance, it is substantially free from scale and is of a uniform degree of hardness and stiffness throughout. The mechanical working of the metal has refined its crystalline structure so that it is hard, fine grained, dense, tough and not easily broken, and is capable of taking and retaining a sharp edge or point for a long time; it is substantially free from internal stress so that when the blanks are punched out they remain flat and do not require peening so that their original smoothly polished surfaces are not marred by indentations, while the teeth, once formed, show no tendency to twist or deflect; and since the cold rolled steel is of much more accurate and uniform gauge than hot rolled steel, it is possible to build up saw cylinders from standard parts with the assurance that the blades will fit accurately between the bars of the grate fall. Moreover, although the cold rolled steel is tougher and more durable than the core portion of a hot rolled plate, it is easier to file a tooth on a cold rolled blade since the tooth is devoid of the very hard but useless outer scale or skin found on the hot rolled plate.

Further, and of greatest importance, the teeth of a saw blade made from cold rolled steel remain true, accurate and sharp for a long time, and it is possible to set the gin with greater accuracy so as to leave a certain desired percentage of fiber on the seeds, than is possible with saws made from hot rolled steel, and when it is desired to produce clean fiber of high quality, this is a real desideratum in the operation of a gin. On the other hand, the accuracy of the blades permits setting the gin so as to remove substantially all of the fiber from the seeds, if desired.

In the accompanying drawing I have illustrated certain steps in the production of a gin saw blade embodying my invention, and in the drawing Fig. 1 is a diagrammatic plan view illustrating an early step in the process of making gin saw blades;

Fig. 2 is a fragmentary section to large scale on the line 2—2 of Fig. 1;

Fig. 3 is a side elevation of a gin saw blade showing the general form of the teeth;

Fig. 4 is a fragmentary edge view of the blade shown in Fig. 3;

Fig. 5 is a fragmentary section to large scale, substantially on line 5—5 of Fig. 3, illustrating one step in the process of making the blade;

Fig. 6 is a fragmentary longitudinal section through the axis of a gin saw cylinder shaft illustrating a usual way of mounting the blades on the shaft; and Fig. 7 is a section similar to Fig. 5, but illustrating the usual practice in making gin saw blades.

In accordance with the present invention I first select cold rolled sheet steel of the gauge of the desired gin saw blade and of a chemical composition or analysis such as has proven by the experience to be useful for the purpose. Ordinarily, the cold rolled steel may be of the same analysis as the hot rolled steel commonly employed for the same purpose and which is well known to those skilled in the art.

After procuring such a sheet of cold rolled steel, I next proceed to punch out of otherwise cut from the sheet material annular blanks of the desired diameter as indicated at 2. These blanks show no tendency to twist or warp after cutting and have no distinct outer skin differing from the body of the material.

Since the usual peening operation is unnecessary, the cold rolled blanks being accurately flat when punched out, the next step in the operation is to form the dents or teeth 3 upon the outer edge of the annular body portion of the blade. These teeth may, if desired, be roughly formed in the punching operation or alternatively may be made after the punching operation is completed. The teeth may be given their final depth and inclination by a gumming operation such as is commonly employed in making saw blades and this operation is succeeded by a filing operation which reduces the teeth to a pyramidal shape as shown for example in Fig. 4. This filing removes portions 4 (Fig. 5) from each side of the tooth leaving the tooth of substantially the transverse section indicated at 5 in Fig. 5, and having the points 6 (Fig. 4) which are disposed in the mid plane of the blade. These teeth possess the same characteristics as the metal of the blank, being tough, fine grained, wear resistant, and capable of maintaining a sharp edge for a long time.

The blades which have thus been prepared may be mounted upon a cylinder shaft in usual manner as illustrated in Fig. 6. This shaft is usually provided at each end with a compression collar 8 (but one of which is shown) and the blades are mounted in series on the shaft with interposed spacers or washers 9. By the use of my improved blades, it is possible to build up a saw cylinder of predetermined dimensions by the use of spacer members 9 of standard thickness, and when the compression heads 8 are clamped against the series of blades, the pressure is uniform at all sides of the axis of the shaft and there is no tendency to bend the shaft and throw it out of alignment, nor is any difficulty experienced in the use of such a saw cylinder from interference between its blades and the grate-fall bars of the gin. Since it is possible to use spacers 9 of standard dimensions, the process of building up the cylinder and repairing it is greatly facilitated.

As compared with my new blade a saw blade made from hot rolled steel comprises, the central or core portion 10 (Fig. 7) which is coarse grained and under non-uniform internal stress, and which has outer skins or layers 11 of very hard hammer scale resulting from the rolling operation. When, in filing the teeth upon such a blank, the portions 13 are removed, the body of the tooth 12 consists wholly of the core material of the blank, and the tooth is relatively soft and incapable of withstanding hard usage or of taking a fine edge.

On the other hand a saw blade made from cold rolled steel, in accordance with my above process, or may be depended upon the perform its function with accuracy, so that the proportion of fibers removed from seeds may be gauged much more certainly than is usual.

While I have indicated certain steps desirable in the process of making a gin saw blade, I wish it to be understood that my present process is capable of modification without departing from the spirit of the invention and I contemplate that changes in the described order of steps may be made, or that certain steps may be omitted or others introduced without departing from the spirit of the invention.

I claim:

1. A gin saw blade having an accurately flat and smoothly polished annular body portion provided with projecting teeth at its outer edge, said body portion possessing the characteristics of cold rolled steel, being of substantially uniform thickness throughout and free from hammer-scale, the entire body portion, together with the teeth, being of substantially uniform composition and of fine crystalline structure substantially free from internal stress, the teeth being hard, tough and having their points in permanent and accurate alignment.

2. A gin saw blade of cold rolled steel having a substantially flat and smooth annular body provided with projecting pyramidal teeth at its outer edge, said teeth being tough, hard and capable of taking and retaining a fine edge and being accurately and permanently positioned relatively to one another, the body of the blade being of homogeneous, uniform composition free from hard surface layers, and of dense, fine grained structure.

3. That method of making gin saw blades which comprises as steps preparing an accurately flat and smoothly polished annular blank of uniform and accurately predetermined thickness, homogeneous composition, free from surface scale and of fine and dense crystalline structure, and substantially devoid of internal strains in a single operation by punching it from cold rolled steel, shaping the outer edge of the blank to form teeth, and filing said teeth to pyramidal shape, thereby producing a stiff blade of standard and predetermined thickness whose body and teeth are of uniform texture, the teeth being tough and capable of taking and retaining a fine edge, the blade being adapted for assembly in series with similar blades and interposed spacers of standard thickness to form a saw cylinder of standard and accurate dimensions.

4. A gin saw blade comprising an annulus of smooth flat steel having projecting pyramidal teeth devoid of set at its peripheral edge, said blade being of substantially uniform thickness throughout, substantially free from hammer scale, and substantially free from internal strain, the entire blade including the teeth being of substantially uniform crystalline structure, and the teeth being tough, hard and capable of taking and retaining a fine edge.

ROBERT W. McLEAN.